United States Patent [19]
Suzuki et al.

[11] Patent Number: 5,253,158
[45] Date of Patent: Oct. 12, 1993

[54] APPARATUS FOR SUPPORTING THE DEVELOPMENT OF SEQUENCE SOFTWARE TO BE USED IN AUTOMATED EQUIPMENTS, AND METHOD THEREOF

[75] Inventors: Kenichiro Suzuki, Hirakata; Katsutoshi Ohnishi, Osaka; Kenji Sajima, Amagasaki; Masanobu Miyata, Neyagawa, all of Japan

[73] Assignee: Matsushita Electric Industrial Co., Ltd., Osaka, Japan

[21] Appl. No.: 690,251

[22] Filed: Apr. 23, 1991

[30] Foreign Application Priority Data

Apr. 23, 1990 [JP] Japan ................. 2-107223

[51] Int. Cl.$^5$ .................. G05B 19/00; G06F 9/455
[52] U.S. Cl. .................. 364/140; 364/147; 364/191; 364/578; 364/DIG. 2; 364/926.9; 364/949; 364/933.8; 395/500
[58] Field of Search ................. 364/140–147, 364/136, 188, 189, 191–193, 578, DIG. 2; 395/500, 275

[56] References Cited

U.S. PATENT DOCUMENTS

| | | | |
|---|---|---|---|
| 4,494,191 | 1/1985 | Itoh | 395/500 |
| 4,513,366 | 4/1985 | Munekata et al. | 364/191 X |
| 4,870,561 | 9/1989 | Love et al. | 364/192 |
| 5,113,359 | 5/1992 | Kiya et al. | 364/578 |

*Primary Examiner*—Joseph Ruggiero
*Attorney, Agent, or Firm*—Wenderoth, Lind & Ponack

[57] ABSTRACT

An apparatus is provided for supporting the development of a sequence software to be used for controlling the operation of an automated equipment. A sequencer specification input device inputs specification information of various types of sequencers. Equipment characteristics of an equipment to be controlled are implemented by inputting simulated characteristic thereof. An arbitrary environment of the operation of the equipment is implemented by inputting a simulation condition. The result of the executed operation of the equipment can be checked in an arbitrary form.

5 Claims, 5 Drawing Sheets

Fig. 3

S1 working memory is produced based on information of equipment characteristic

S2 input point state is transmitted to sequencer

S3 output point state is received from sequencer

S4 information of output point, state of which has changed is outputted to external storing device

S5 is there working memory in which output point condition satisfies start condition? — NO

S6 (YES) state transition is produced in structure form based on working memory satisfying condition

S7 state transition produced in structure form is rearranged in the order of generation time

S8 state transition which is to occur earliest is executed and information of input point which has changed is outputted to external storing means

S9 is simulation executed step by step? — NO

S11 (YES) is input point state rewritten for manual operation? — NO

S11 (YES) rewritten information for manual operation is outputted to external storing device

APPARATUS FOR SUPPORTING THE DEVELOPMENT OF SEQUENCE SOFTWARE TO BE USED IN AUTOMATED EQUIPMENTS, AND METHOD THEREOF

BACKGROUND OF THE INVENTION

1. Field of the Invention

The present invention relates to an apparatus and method for supporting the development, i.e., the estimation and the correction, of a sequence software to be used for controlling the operation of automated equipment.

2. Description of the Related Art

According to the conventional method used in developing a sequence software for controlling the operation of automated equipment, the sequence software is constructed based on the operation specification of the equipment, the sequence software is loaded in a sequencer, and the operation of the equipment is checked while the sequence software is debugged.

The conventional method requires the checking of the entire operation of the equipment in order to debug the software. Accordingly, although the sequence software is complete, the software cannot be debugged until the entire equipment is completed and it is difficult to conduct an abnormality test associated with conditions which may endanger the entire equipment.

SUMMARY OF THE INVENTION

Accordingly, it is an essential object of the present invention to provide an apparatus and a method thereof, for supporting the development of a sequence software, capable of debugging a sequence software prior to the completion of the automated equipment and allowing an operation test of the automated equipment to be carried out in an arbitrary condition including a test for detecting an abnormality.

In accomplishing this and other objects, there is provided an apparatus for supporting the development of a sequence software comprising: a sequencer specification input means for inputting the specification information of a sequencer into a specification information memory means; an equipment characteristic input means for inputting the mechanism characteristic information of an equipment to be controlled into a subject mechanism characteristic information memory means; a simulation condition input means for inputting the simulation condition information of the operation of an equipment into a simulation condition information memory means upon execution of a simulation by using the information outputted from the sequencer specification input means and the equipment characteristic input means; a simulation executing means for executing the simulation by using the information outputted from the sequencer specification input means, the equipment characteristic input means, and the simulation condition input means; a simulation result information memory means for storing information relating to the simulation resultant; and a simulation result checking means for checking the output result of the simulation execution.

Also, the present invention is to provide a method for supporting the development of a sequence software to be used for controlling the operation of automated equipment comprising the steps of determining an equipment to be subjected to control which operates by means of at least one unit each combined with a sensor and an actuator; presenting simulating the respective unit by means of an information unit including information for changing the output state of the sensor after the lapse of a certain time in response to the input state of the actuator inputted from a control apparatus; simulating the operation of the automated equipment on the employment of a given control software by adapting the information unit, and estimating and amending the control software on the basis of the resultant to be obtained by the above simulation.

According to the above construction, the sequencer specification input means for inputting specification information of sequencers can be easily applied to various types of sequencers; the equipment characteristic of an equipment to be controlled can be implemented by inputting the characteristic thereof; an arbitrary environment of the operation of the equipment can be implemented by inputting a simulation condition; and the result of the executed operation of the equipment can be checked in an arbitrary form.

Thus, the characteristic of the mechanism of the equipment is inputted to simulate an equipment operation under an arbitrary program. Accordingly, the program can be debugged in a short period of time and the apparatus has a favorable function for detecting an abnormality and revising the program being created.

BRIEF DESCRIPTION OF THE DRAWINGS

These and other objects and features of the present invention will become apparent from the following description taken in conjunction with preferred embodiments thereof with reference to the accompanying drawings, in which:

FIG. 3 is a flowchart showing a procedure executed by a simulation executing means;

DETAILED DESCRIPTION OF THE INVENTION

Figure 1:
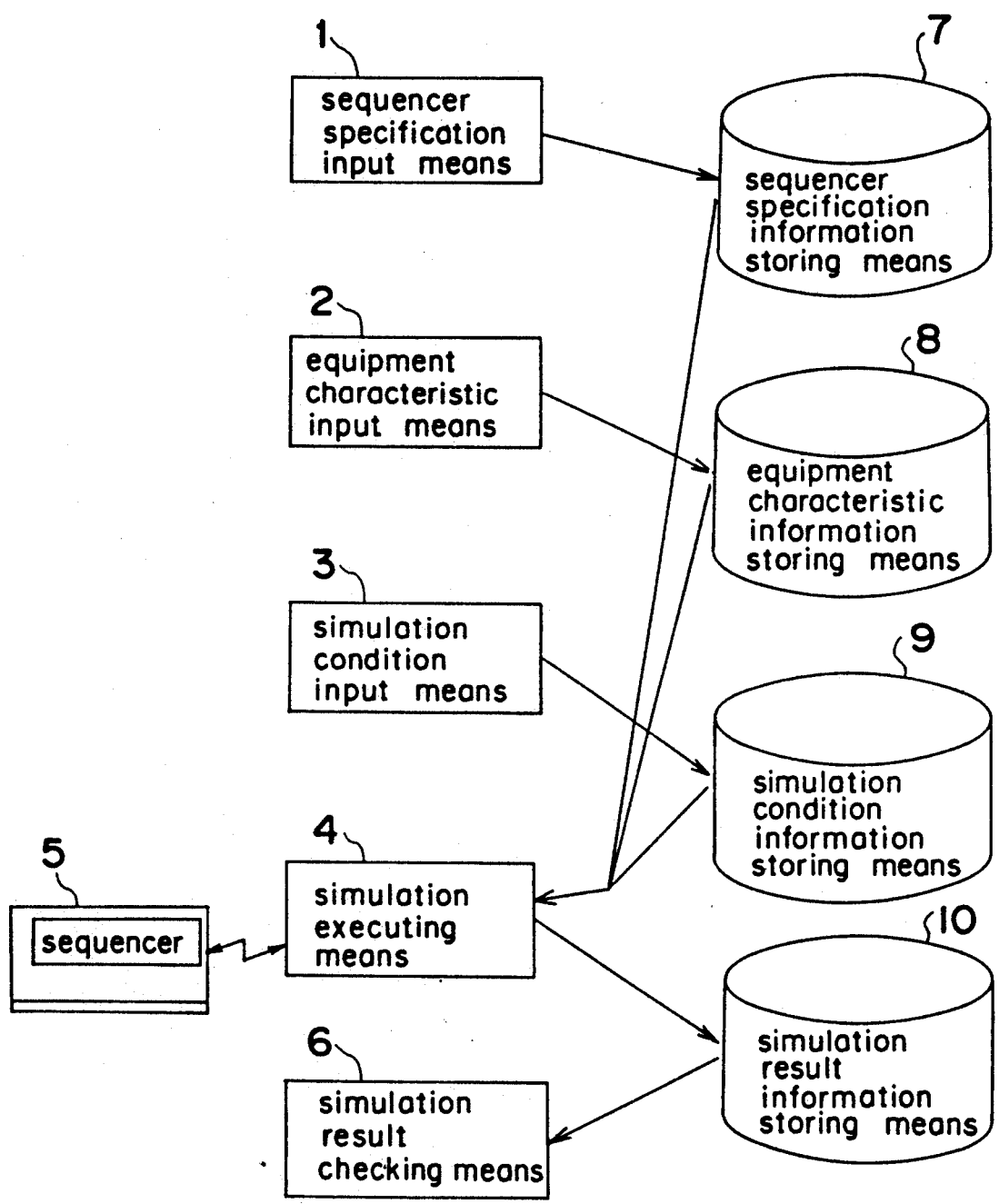
FIG. 1 is a view showing an apparatus for supporting the development of sequence software according to an embodiment of the present invention.

Before the description of the present invention proceeds, it is to be noted that like parts are designated by like reference numerals throughout the accompanying drawings.

FIRST EMBODIMENT

Referring to FIG. 1, an apparatus for supporting the development of sequence software according to a first embodiment of the present invention is described below. In FIG. 1 showing a block diagram of the apparatus, a sequencer specification information input means 1 determines a simulation according to the kind of a sequencer 5 provided with a software program to be controlled, thus outputting specification information to a sequencer specification information storing means 7 to be stored therein. The sequencer 5 is a an information processing medium having one or two input terminals and at least one output terminals. The sequencer 5 includes functions for changing the state of the output terminals depending on the state of the input terminals after the lapse of a given time, such as an FA controller, a general controller and the like. An equipment characteristic information input means 2 simulates an equipment by outputting simulated equipment information to a subject equipment characteristic information storing means 8 to be stored therein. A simulation condition information input means 3 decides the initial conditions for the simulating operation of the equipment and the control conditions during thus execution of the simulation, and outputs corresponding information to a simulation condition information storing means 9 to be stored therein. A simulation executing means 4 implements an imaginary equipment of the subject in itself based on the information having been stored in the subject equipment characteristic information storing means 8 and simulates the operation of the imaginary equipment in a condition based on the information having been stored in the simulation condition information storing means 9 while the simulation executing means 4 is communicating with the sequencer 5 having a control program in a mode similar to the mode in which an actual subject equipment is controlled. Information generated by the simulation executing means 4 is stored in a simulation result information storing means 10. The sequencer specification information storing means 7 establishes a correspondence between the input/output address of the sequencer 5 and the port address of a computer for implementing the simulation executing means 4 when a communication between them is carried out by using a parallel input/output. It is noted that the sequencer specification information storing means 7 is for comparing the input and output addresses of the sequencer 5 with port addresses of a computer to be employed as the simulation executing means 4 for the purpose of establishing a communication on the employment of input and output connected in series. For instance, if a personal computer is employed as the simulation executing means 4, the sequencer specification information storing means 7 is adapted which such that the state of which output terminals of the sequencer can be obtained by reference to memory addresses of the personal computer, and the state of the input terminals of the sequencer 5 can be changed to write by the information of which memory addresses of the personal computer are. The sequencer 5 is presented by a FA controller, a general computer and the like with providing a function for dividing the ON/OFF state of the output terminal under depending upon the control software stored in an internal memory and the ON/OFF state of the input terminal. A simulation result checking means 6 displays simulation result information stored in the simulation result information storing means 10.

Figure 2A:
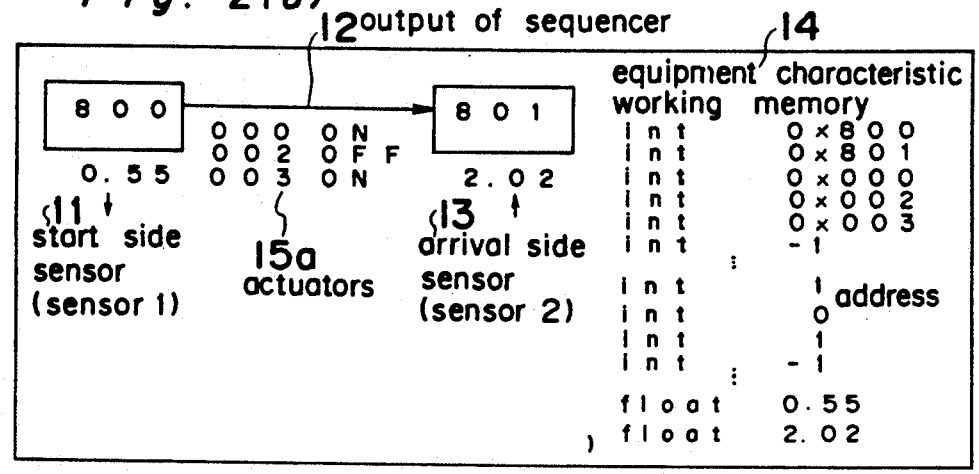
FIG. 2A through 2C are views showing equipment characteristic information.
Figure 2B:
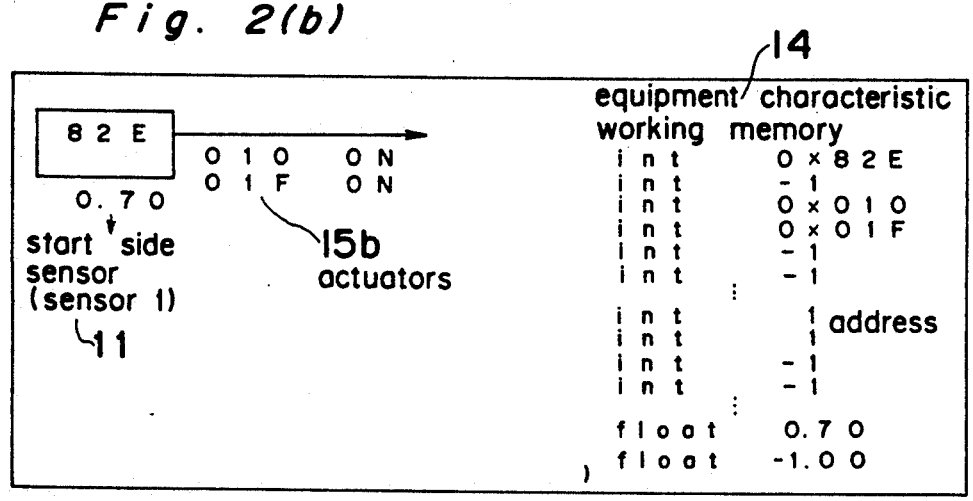
Figure 2C:
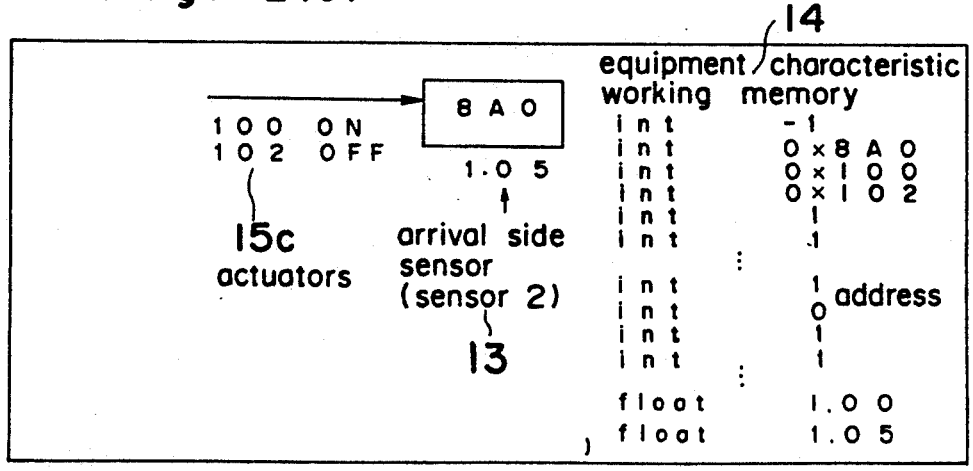

FIGS. 2a through FIG. 2c show a method for implementing the subject equipment characteristic information. The subject equipment characteristic information in the embodiment is given in an enumeration of the combination of a local sensor 11, 13 and an actuator without considering the entire subject equipment and the information of each combination is stored in a storing region of structure form called a working memory 14. The working memory 14 for storing the subject equipment characteristic information essentially comprises a pair of sensors 11 and 13; at least more than one actuator 15 allowing the sensors to communicate with each other regarding the actuating state thereof; and the period of time required for the transition of the actuating state of the sensors to the actuator. FIG. 2a shows an example of the transition of the actuating state from one state to another between the sensors and actuator. If the state of the sequencer 5 satisfies the condition that the output addresses "000" and "003" of the sequencer 5 are ON and the other output address "002" is OFF with a sensor 11 connected to the an input address "800" of the sequencer 5 being ON, the sensor 11 connected to the "800" address is turned OFF in 0.55 seconds and a sensor 13 connected to "801" address is turned ON in 2.02 seconds according to the operation of the actuators connected to the output addresses. In this example, the number of actuators which contribute to the generation of the transition of the lighting state of the sensors is three. A flag of an address and the actuating state of the sensor is set to "−1" in a region for storing the information of four or more actuators so as to display the nonuse of actuators. In this embodiment, the sensor 11 connected to the "800" address is called a start side sensor or a first sensor, and the sensor 13 connected to the "801" address is called an arrival side sensor or second sensor.

It is necessary to form an imaginary equipment characteristic information in consideration of the subject equipment in which only the start side sensor or the arrival side sensor is provided. As an example, such an equipment characteristic information is formed in consideration of the supply of a work to the equipment or the discharge of a work therefrom. In this case, a display method as shown in FIGS. 2B and 2C is used. FIG. 2B shows a state in which when actuators 15b of "010" and "01F" are turned ON with a start side sensor 11 of "82E" being ON, the start side sensor 11 of "82E" is turned OFF in 0.70 seconds and no other sensors are turned on as a result of this operation. FIG. 2C shows that if an actuator 15c of "100" is ON and an actuator 15c of "102" is OFF, an arrival side sensor 13 of "8A0" is turned ON unconditionally in 1.05 seconds irrespective of the state of the sensor.

FIG. 3 shows the processing procedure to be executed by the simulation executing means 4. At the step S1, the working memory for storing the subject equipment characteristic is produced based on information read from the equipment characteristic information storing means 8. At the step S2, the information of a sensor stored by the simulation condition information storing means 9, namely, the initial state of an input point for the sequencer 5 is transmitted to the sequencer 5. The sequencer 5 constitutes a predetermined output point state according to a program of software provided therein and a simulator to be constituted by a personal computer receives the information of the output point state from the sequencer 5 at the step S3. The content of the information received by the simulator is the initial state of the output point of the sequencer 5. The sequencer 5 outputs the information of the initial state to an external storing device such as a ROM at step S4. The content of the output from the sequencer 5, namely, time, the address of the output point, ON or OFF of the sensor is indicated by the flag. When the program passes through the step procedure S3 at second or subsequent time, the same procedure as described above is executed only on an output point, the state of which has changed from a previous time. At the step S5, the working memory for storing the equipment characteristic represented at the second time is retrieved according to a rule processing. At the step S6, the information of a state transition is produced in a structure form based on the working memory coinciding with the output point state read at the step S3. The content of the information produced in the structure form is indicated by the flag of the address of an input point which has changed, the time when the input point has changed, and the actual state of ON or OFF of the sensor.

At the step S7, after all the working memories are retrieved, the information of the state transition in the structure form is sorted in the order of generation time. At the step S8, the information of the state transition which is to occur earliest is executed, i.e., the input point state is rewritten and the information of the input point which has changed is outputted to the external storing device. Then, the program returns to the step S2 at which the rewritten state of the input point is transmitted to the sequencer 5. Thereafter, processings are repeated from the step S2 through the step S8.

One cycle of a closed loop processing thus defined is called a total step. Normally, the program goes from the step to the next step successively, but it is possible to execute a simulation step by step. In this case, the information of the input point state is forcibly rewritten at the step S10. The rewritten information is outputted to the external storing device at the step S11. Normally, this operation is executed not on the information of a sensor but on the information of an input point allocated to switches for controlling a machine. The information of the state transition outputted to the external storing device by the above means is the information of a simulation result.

SECOND EMBODIMENT

Figure 4A:
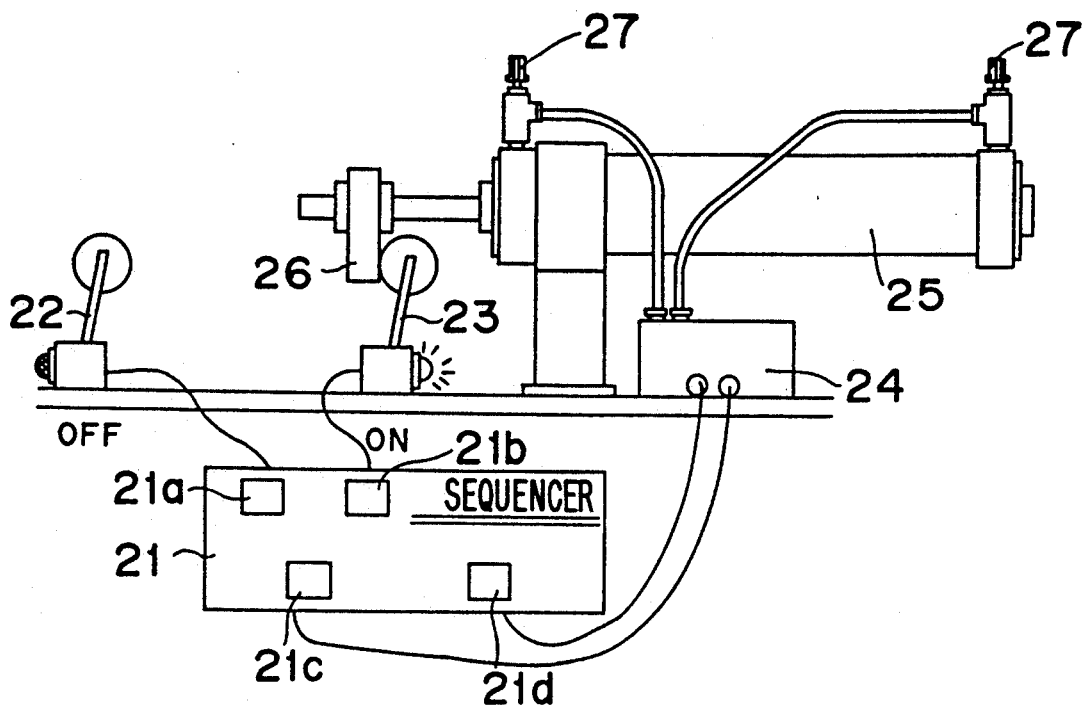
FIG. 4A to 4C are views showing an apparatus connected with a sequencer according to another embodiment of the present invention.
Figure 4B:
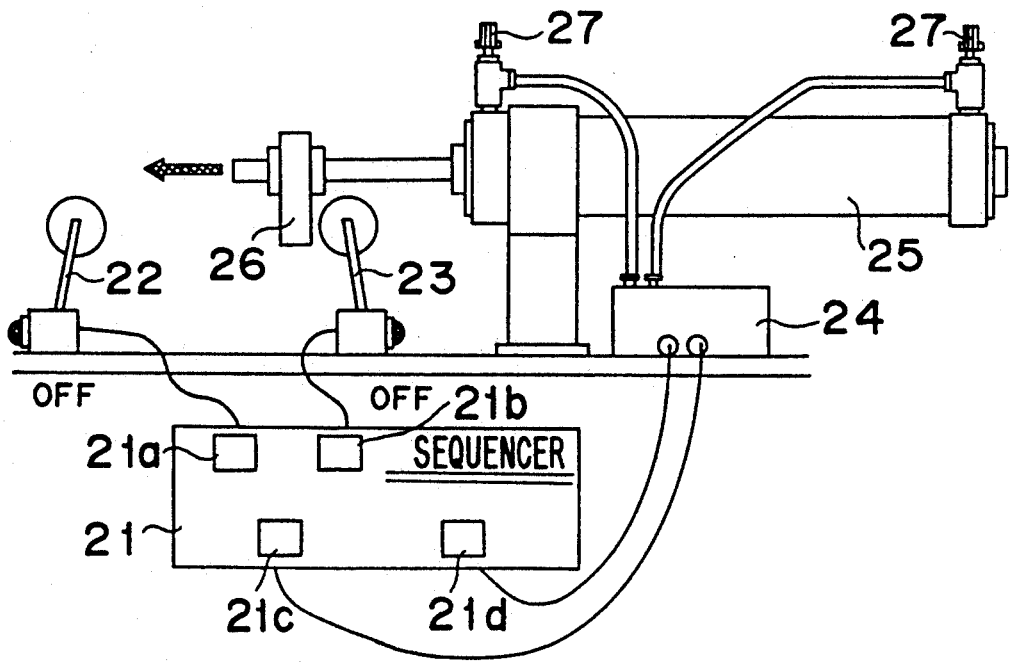
Figure 4C:
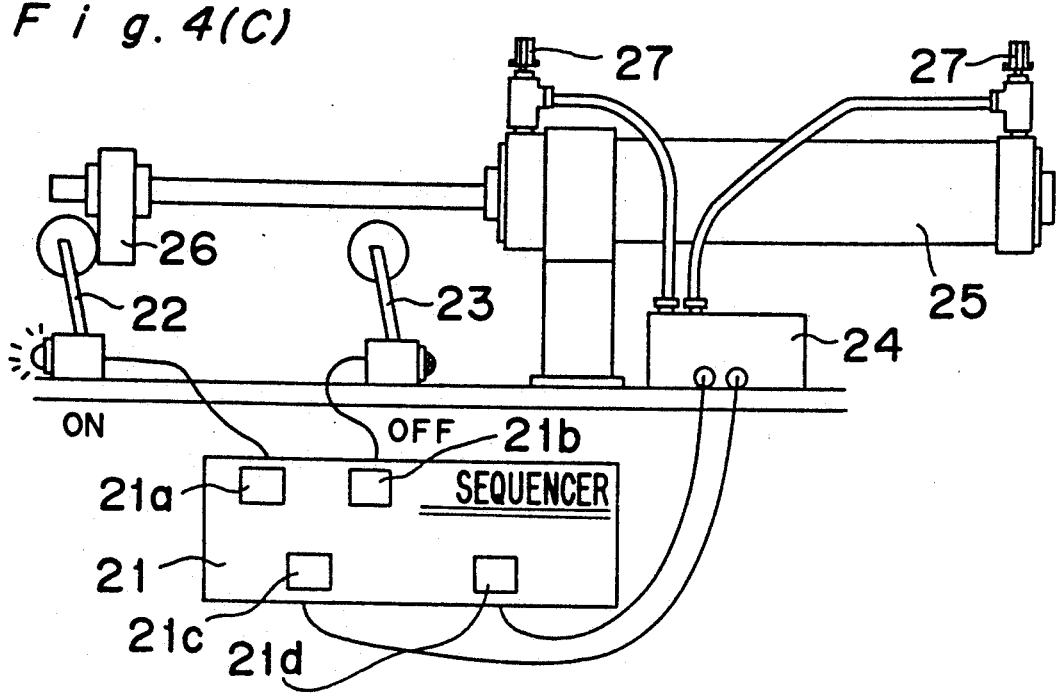
Figure 5:
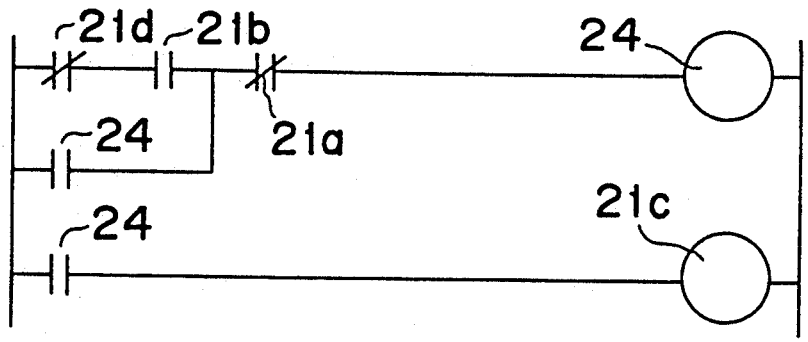
FIG. 5 is a circuit diagram of the apparatus of FIG. 4.
Figure 6:
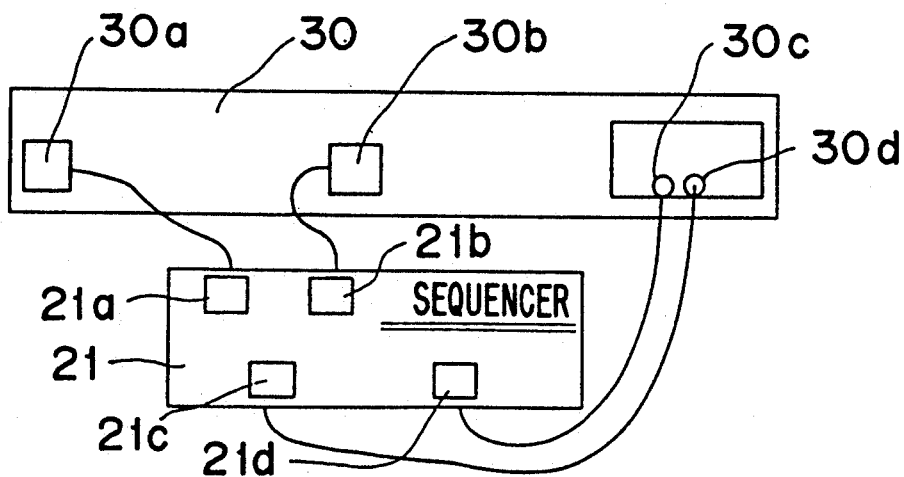
FIG. 6 is a views showing an apparatus for supporting the development of sequence software according to the another embodiment of the present invention.

FIGS. 4 to 6 show an arrangement of a sequencer 21 combined with sensors 22, 23 and actuators 24, 25, 26 according to a second embodiment of the present invention. In FIG. 4 showing a front view of the arrangement, the sequencer provides a pair of sensor terminals 21a, 21b and a pairs of actuator terminals 21c, 21d. The sensors are a pair of limit switches 22, 23 each connected to the respective sensor terminal of the sequencer 21 and being able to take either one of positions, ON and OFF. The actuators 24 are a pair of electrodes of a solenoid connected to the actuator terminals of the sequencer 21 for actuating an electromagnet activated valve 24 for operating a cylinder 25 having a kicker 26 which can operate either one of the limit switches 22, 23 in accordance with the positions of the cylinder 25.

When the valve 24 is activated by the sequencer 21 to open, the cylinder 25 is moved rightwardly through pressed air together with the kicker 26 which is going to press the one of the switches ON, while the other switch is kept OFF, as shown in FIG. 4A. On the contrary, when the valve 24 is de-activated by the sequencer 21 to close, the cylinder 25 is moved leftwardly through air releasing in accompanying with the kicker 26 which is going to press the other switch ON, while the one switch becomes OFF, as shown in FIG. 4C. FIG. 4B shows the intermediate position of the cylinder between the positions of FIG. 4A and 4C, wherein both of the switches are OFF.

The cylinder 25 is provided with a pair of speed controllers 27, 28 which determine the period of time for moving the cylinder 25 from one position of FIG. A for the operation of one switch to the other position of FIG. C for the operation of the other switch.

With the above arrangement, in the first situation of FIG. 4A the sequencer 21 is operated in such a manner that one sensor terminal 21a connected with one switch 22 of left side is OFF, the other sensor terminals 21b connected with the other switch 23 of right side is ON, while one actuator terminal 21C of left side connected with one electrode of the solenoid is ON, and the other actuator terminal 21d of right side connected with the other electrode of the solenoid is OFF, so that the cylinder 25 is going to move leftwardly to he next situation of FIG. 4B.

After one period of time t1 has been passed from the first situation of FIG. 4A, the arrangement is changed to the second situation of FIG. 4B. In the second situation, the other sensor terminal 21b is turned from On to OFF, while the other terminals 21a, 21c, 21d are kept on the same positions to those of the first situation, so that the cylinder 25 is moving on leftwardly to the next situation of FIG. 4C.

After the other period of time t2 has been passed from the second situation of FIG. 4B, the arrangement is changed to the third situation of FIG. 4C. In the third situation, the one sensor terminal 21a at the left side is turned from OFF to On, and the one actuator terminal 21C at the left side is then turned from On to OFF, while the other terminals 21b, 21d at the right side are kept on OFF, so that the cylinder 25 is stopped at the position of FIG. 4C. It is noted that the above sequence for operating the cylinder in response to the ON-OFF state of the switches is adapted to store within the sequencer 21, with providing a sequencial program which can be shown with an electric circuit as shown in FIG. 5.

Also, the arrangement of FIG. 4 can be imitated by a model of mechanical information unit including a departure sensor terminal 21b, an arrival sensor terminal 21a, a first actuator terminal 21c, a second actuator terminals 21d, a departure time t1, and an arrival time, which can be, in turn, realized by a software program to be stored within a personal computer. Accordingly, the apparatus of the present invention is provided in combination of the sequencer 21 having the sequencial program and the personal computer 30 having the software program directed to the mechanical information unit including terminals 30a to 30d connected respectively with the terminals 21a to 21d of the sequencer 21, as shown in FIG. 6, and the simulation for the imaginary equipment is easily done through the communication between the sequencer 21 and personal computer 30 for simulating the correctness of the sequence in accordance with the above operation in the following manner.

1. The personal computer 30 sends to the sequencer 21 a first information of the switch situations, such as, the left switch 22 is OFF and the right switch 23 is ON.

2. With a program stored in the sequencer 21, the sequencer 21 produces a first situation of the actuator terminals, such as, the left actuator terminal 21a is ON and the right actuator terminal 21b is OFF, in response to the first information from the personal computer 30.

3. The personal computer 30 reads the first situation of the actuator terminals 21c, 21d in sequencer 21, the left terminal 21c being ON and the right terminal 21d being OFF.

4. After one period of time t1 has been passed, the personal computer 30 sends to the sequencer 21 a second information of the switch situation, such as, the left switch 22 is OFF and the right switch 23 is OFF.

5. With the program of the sequencer 21, the sequencer 21 produces a second situation of the actuator terminals 21c, 21d, such as keeping the same condition of the first situation in response to the second information from the personal computer 30.

6. The personal computer 30 reads the second situation of the actuator terminals 21c, 21d in sequencer 21, the left terminal 21c being ON and the right terminal 21d being OFF.

7. After the other period of time t2 has been passed, the personal computer 30 sends a third information, such as, the left switch 22 is ON and the right switch 23 is OFF.

8. With the program of the sequencer 21, the sequencer 21 produces a third situation of the actuator terminals 21c, 21d, such as, the left actuator terminal 21c is OFF and the right actuator terminal 21d is OFF.

9. The personal computer 30 reads the third situation of the actuator terminals 21c, 21d in sequencer, the both terminals 21c, 21d being OFF.

With the above nine steps of communication between the personal computer 30 and the sequencer 21, the sequencer 21 can be checked to effect correction of the programs contents without providing actual devices such as switches and solenoid a connected with a cylinder, by the reading of the personal computer 30 which stores the state of the switches in time sequence and reads the status of the sequencer depending on the state of the switches.

According to the apparatus of the embodiments, the sequencer specification input means inputs specification information of various types of sequences; the equipment characteristic input means simulatively implements the equipment in a computer; the simulation condition input means inputs information of various simulation conditions; the simulation condition executing means executes a simulation; and the simulation result checking means evaluates the simulation result. Therefore, the apparatus allows an operator to facilitate the simulation of the operation of an equipment under an arbitrary state.

According to the present invention, the operator can simulate the operation of the equipment in an arbitrary condition under the control of the sequence software program. Therefore, the development of the sequence software program can be accomplished before the construction of the actual subject equipment is completed. Further, without operating equipment, the sequence software capable of favorably coping with an abnormal operation can be developed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for supporting the development of a sequence software to be used for controlling the operation of an automated equipment, comprising:

sequencer specification input means for inputting specification information of a sequencer into a specification information memory means;

equipment characteristic input means for inputting mechanism characteristic information of an equipment to be controlled into a subject mechanism characteristic information memory means, said mechanism characteristic information defining characteristics of the equipment by enumeration of the combination of a local sensor and an actuator of the equipment;

simulation condition input means for inputting simulation condition information of simulated operation conditions of the equipment into a simulation condition information memory means during an executed simulation of the equipment using information outputted from said sequencer specification input means and said equipment characteristic input means;

simulation executing means for executing the simulation of the equipment using information outputted from said sequencer specification input means, said equipment characteristic input means, and said simulation condition input means;

simulation result information memory means for storing an information relating to results of the simulation of the equipment; and simulation result checking means for checking the results stored in said simulation result information storing means.

2. An apparatus for supporting the development of a sequence software to be used for controlling the operation of an automated equipment, comprising:

a computer for reproducing contents of a simulated operation of a subject equipment to be controlled, the contents including a software program for controlling the subject equipment; and a sequencer provided with a sequential program for controlling the subject equipment and output and input terminals connected with the computer for establishing an electrical communication therebetween, the state of the output terminal depending on the sequential program to be actuated depending on the state of the input terminal, while the state of the input terminal is changed depending on the output terminal after the lapse of a give time, wherein the computer has a function for simulating the sequential program of the sequencer through the addresses of the computer connected with the terminals of the sequencer.

3. A method for supporting the development of a sequence software to be used for controlling the operation of an automated equipment comprising the steps of:

inputting specification information of a sequencer into a specification information memory;

inputting subject mechanism characteristic information of an equipment to be controlled into a subject mechanism characteristic information memory, the subject mechanism characteristic information defining characteristics of the equipment by enumeration of the combination of a local sensor and an actuator of the equipment;

inputting simulation condition information denoting simulated operation conditions of the equipment into a simulation conditions information memory during an executed simulation of the equipment using the information input in the sequencer specification information memory and characteristic information memory;

executing a simulation of the equipment using information outputted from said sequencer specification memory, said equipment characteristic memory, and said simulation condition memory; and checking an output result of the executed simulation of the equipment.

4. A method for supporting the development of a sequence software to be used for controlling the operation of an automated equipment comprising the steps of:

determining an equipment to be subjected to control which operates by means of at least one unit each combined with a sensor and an actuator;

simulating the respective units by means of information units including an information for changing the output state of the sensor after the lapse of a certain time in response to the input state of the actuator inputted from a control apparatus:

simulating the operation of the automated equipment by the employment of a given control software which is responsive to the information units; and estimating and amending the control software on the basis of results obtained by the above simulation.

5. The method for supporting the development of a sequence software as defined in claim 4, further comprising a step for estimating and amending the sequence software used to control the operation of the automated equipment.

* * * * *